United States Patent

[11] 3,602,364

[72] Inventors Ralph A. Maglio
Westhampton;
Donald N. Russell, Easthampton, both of, Mass.
[21] Appl. No. 843,595
[22] Filed July 22, 1969
[45] Patented Aug. 31, 1971
[73] Assignee J. P. Stevens & Co., Inc.
New York, N.Y.

[54] SEGMENTED BELT
16 Claims, 12 Drawing Figs.

[52] U.S. Cl. ................................................. 198/193,
305/35
[51] Int. Cl. .................................................B65g 15/30,
B62d 55/08
[50] Field of Search .......................................... 198/195,
197, 198; 305/34, 35, 36, 37, 38

[56] References Cited
UNITED STATES PATENTS
| | | | |
|---|---|---|---|
| 2,693,268 | 11/1954 | Ball ............................. | 198/195 X |
| 3,120,409 | 2/1964 | Beall ........................... | 305/38 X |
| 3,189,115 | 6/1965 | Rethorst ..................... | 305/35 X |

FOREIGN PATENTS
| | | | |
|---|---|---|---|
| 824,043 | 9/1968 | Canada ....................... | 305/38 |
| 462,126 | 6/1928 | Germany ..................... | 305/38 |

*Primary Examiner*—Evon C. Blunk
*Assistant Examiner*—H. S. Lane
*Attorneys*—Robert Ames Norton, Michael T. Frimer and Saul Leitner

ABSTRACT: A flexible belt formed of hinged segments with two or more segments and preferably separated by spaces. The belt is formed of a suitable plastic, such as an elastomer of the polyurethane type. On one side of each segment there are short integral hollow cylinders and mating cylinders on the other side. When two units are placed together the hollow cylinder portions meet to form a substantially complete cylinder in the same manner as a series of hollow cylinders in a hinge for a door. A pin, such as a more or less rigid nylon pin, is passed through the cylinders of the units to form a hinged structure, and this is repeated until endless flexible belts are produced. The units have flat surfaces abutting opposite flat surfaces at the joint, which prevents the hinge opening any substantial amount. The belts are principally useful as snowmobile treads but are also effective for power transmission or for conveyors. The belts are provided with suitable openings or projections which can engage pulleys or sprockets for drive purposes. Some flexibility in each unit is necessary to give the desired belt contour.

PATENTED AUG 31 1971 3,602,364

INVENTORS.
RALPH A. MAGLIO
DONALD N. RUSSELL
BY
*Robert Ames Norton*
ATTORNEY

INVENTORS.
RALPH A. MAGLIO
DONALD N. RUSSELL

ATTORNEY

INVENTORS.
RALPH A. MAGLIO
DONALD N. RUSSELL
BY
ATTORNEY

INVENTORS.
RALPH A. MAGLIO
DONALD N. RUSSELL

BY

ATTORNEY

SEGMENTED BELT

BACKGROUND OF THE INVENTION

Endless belts of elastic or other material with suitable projections forming cleats are used on snowmobiles as the driving track. Many problems are presented because of stretch and the like, expense of molding complicated shapes, and other problems.

Tracks of hinged metal segments have also been used for military tanks, crawler tractors, and the like. They are heavy and unsuitable for use as belts which must have additional flexibility. Also, as there is no elastic give to the tracks, segmented rail elements must be provided on which a large number of bogie wheels can run. This is, of course, unsuitable for most snowmobile work where generally two sprockets are used with a flexible portion of belt between them.

It has also been proposed to prepare segmented conveyor belts with the segments fastened with pins to form integral, molded roller chains which fit in sprockets. This, however, is quite expensive and is not suitable for many uses, such as snowmobiles.

SUMMARY OF THE INVENTION

The present invention utilizes an elastic construction in which endless belts are made with hinged segments of elastomeric material, such as rubber, polyurethane, and the like, which may be either solid or reinforced with fabrics, such as textile fabric, glass fibers, metal wires, and the like, so that a cross section through a hinged segment of each belt resembles part of a door hinge. The number of belts which are formed of the segments are two or more, preferably at least three. In the general description to follow as well as specific description of drawings, an invention in which the belt has three endless belts will be described as a typical illustration, though of course the invention is not limited to this exact number of endless belts when the invention has been assembled. Each belt resembles a part of a door hinge. The belts may be of segments which extend across the full width of the belt, but for many purposes, particularly for snowmobiles tread use, the segments form two or more, for example three, individual belts separated by spaces which constitute slots and can grip sprockets for driving purposes. In snowmobiles treads the spaces also perform the important function that they permit snow to fall through, and the problem of snow packing on a snowmobile track is avoided.

The nature of the elastomeric plastic of which the belt segments are made can vary and will depend in large measure on the use to which the belt is to be put. As flexibility is desired, the elastomer should have a sufficient stretch, and in the case of snowmobile treads they must remain reasonably elastic at quite low temperatures. Among the materials, polyurethanes are particularly important although oil extended rubber, polyepichlorhydrin, and the like may be used. In general, the desired properties will dictate to a large extent the chemical and physical properties of the elastomer used. For example, for snowmobile treads, in order to retain stretch and flexibility at very low temperatures the resin buildings blocks, if polyethers, must not be of too low molecular weight, otherwise the resulting polyurethane becomes too stiff and even brittle at low temperatures. Polyester based polyurethanes are also useful, and in general the present invention is not limited to any particular polyurethane composition so long as it has the needed physical properties.

In general polyurethanes are prepared in two steps, by first forming a prepolymer with the building block resins and as excess of a diisocyanate, such as toluene diisocyanate, methylene bis(4-phenylisocyanate), and the like. These two diisocyanates, which are typical of those in common use, are referred to as TDI and MDI, respectively, and for brevity these abbreviations will be used throughout the present specification. The prepolymer is then treated with a chain extender which extends the linear chain lengths to form the final elastomer. Two general types of chain extenders are in use, namely diamines and diols. A typical example of a hindered diamine, is 4, 4' amino 3, 3' chlorodiphenylmethane. This diamine is generally referred to in the trade as "Moca," and for brevity this abbreviation will be used in the present specification. The most common diol extender is 1, 4 butane diol. The invention is in no sense limited to these typical extenders and other well-known extenders may be used. For snowmobile tread work there is some advantage in using Moca. In general, the nature of the final polyurethane elastomer contains only polyurethane groups when diol extenders are used but alternate the polyurethane groups with ureas when diamines are employed. The amount of extender used will vary, for example from about 90 percent of the free NCO groups in the prepolymer to 100 percent or slightly over, such as 102 percent, depending on the particular properties desired. Where there is an extension of somewhat over 100 percent, of course this means that there is some free extender present in the final elastomer, which has a certain plasticizing effect. In general the present invention is not in any way limited to the particular elastomer, and the ones mentioned above are merely illustrative. Because of the fact that the properties of the polyurethane elastomers are superior and they are usually preferred to other elastomers, such as the rubbers and polyepichlorhydrin, the rest of the description will deal primarily with the preferred polyurethanes, it being understood that the invention is in no sense limited to the use of these particular elastomers. In general, all of the elastomers used are in themselves well-known types, and in the more specific disclosure there will be given only a single illustrative example of a typical polyether based, diamine extended polyurethane. When polyurethanes are used, the normal two-step process with the formation of the prepolymer with excess NCO group followed by chain extension can also be modified by using single step processes, for example those in which a diamine is blended with the particular polyether used and then reacted with the diisocyanate. Satisfactory products can be made by this process but the pot life is very short and the manufacturing control is, therefore, more critical because the material has to be molded or cast within 10 or 15 minutes after the formulation, and therefore it is ordinarily desirable to produce polyurethanes by the more customary two-step procedure. It should be noted that as with all known polyurethanes the cast elastomer proceeds to cross-link somewhat further, for example by atmospheric moisture, and this curing increases the strength and the abrasion resistance of the product. Here again, this is nothing new as these procedures are more or less standard practice in producing polyurethane elastomers, and it is an advantage that the present invention is not limited to a particular, precise operating procedure.

For many purposes, for example some conveyor belts and snowmobiles treads, the straight elastomer is usable. Where, however, greater strength is required there may be fibrous reinforcements, such as nylon fabric, glass fibers, or glass fiber fabrics, metal wires, and the like. In such a case a cross section through a hinged segment of a belt resembles that of a tire.

It will be noted that in general the endless belts are made more flexible by the hinge construction with suitable cutouts so that the hinge can bend through a considerable angle. However, the flexibility of the elastomer is sometimes sufficient and the stretchability or bending confers sufficient flexibility, particularly where sprockets, pulleys, or other elements do not have too small a radius of curvature. Where there are no cutouts in the segments the belt presents a practically unbroken surface, which is of importance for some uses, such as conveyor belts. These belts are also somewhat stronger and may be more suitable for certain power transmission uses where slippage and excessive belt stretch is undesirable. The segments are also useful for other types of structure, for example in an extreme case of shelters reminiscent of a Quonset hut.

For snowmobile tread purposes traction is important, and the outside of the belt is provided with projections, which may either be separate ribs on the separated belts, cleats on the thickened portions where the pins form a hinge, and the like.

Conveyor belts present two different kinds of problems. In some cases it is desirable that the outside, which forms the actual conveyor surface, be relatively smooth. In this case the segments have no ridges or cleats and preferably extend across the full width of the belt. Such smooth surface conveyor belts are useful where they convey materials such as packages, containers to be filled, and the like which may have to be bunched together by intermittent barriers or slid off to the side by deflectors. One problem which arises with the conveying of relatively small sizes of materials, such as sand, coal, and the like, is preventing slippage off the edges of the belt, which can be provided with segments having edge lips molded in. With some conveyors it is, however, desirable to provide against slippage of the materials being conveyed, for example packages and the like. Inserts in the form of suction cups and the like may be molded in or may be inserted in suitable holes in the segments where they are to be of different material, such as, for example, a much softer elastomer.

For snowmobile tread use it is sometimes desirable to provide for increased traction on ice as the snowmobile may leave ordinary packed snow and traverse certain areas of ice on which the ordinary ridges or cleats do not give sufficient traction, or in the case of smooth ribs across the width of the belts, may actually act as sled runners and so come out sideways, skidding. In such cases holes may be present which can be filled with suitable hard inserts, such as tungsten carbide studs of the type often used in the treads of snow tires.

Not only does the present invention permit the production economically of very desirable flexible belts, but the hinged construction provides the enormous advantage that segments can be changed. For example, in the case of a snowmobile track, the track may become torn, and when this occurs there is a very serious problem presented because the ordinary snowmobile endless track has to be mounted over sprockets, either driving or idling, and this requires in many cases an actual mechanical adjustment of the spacing of the sprockets to permit a new belt to be inserted over them. In the extremely hostile environment of cold, winter weather and snow in which the vehicle is often used, this can not only be time consuming but can be extremely uncomfortable. Also, in any event, it requires carrying spare tracks, which are quite bulky as the whole track, has to be carried. In the case of the present invention, however, it is sufficient to carry a few segments and fastening pins, and repair can be made quickly and easily by replacing worn or torn segments. This possibility also has another advantage where the nature of the surface on which the snowmobile is to be used changes. For example, if icy patches are to be encountered it is not necessary to have an entirely new track with carbide studs; it is possible to insert a few studded segments, which will give sufficient traction and which can be rapidly and easily inserted and compactly stored on the vehicle.

Another advantage of the segmented character of the belt is encountered where belts of varying length are to be produced. Where endless belts were molded or cast in the past, special equipment had to used for each length of belt. With the present invention very simple castings of segments can be made and belts of any length desired can be assembled by pinning together the desired number of segments. In many cases this represents an important manufacturing advantage which reduces the cost of equipment as well as making it unnecessary to store large numbers of bulky belts or tracks of different lengths. The segments, of course, can be stored and transported compactly and assembled into belts or tracks of any desired length.

The hinge construction of the segments of the present invention requires, of course, that there be cylindrical hollows molded in. This, however, presents no problem as molding with suitable mandrels is a common procedure in the art and well-known equipment can be used.

The pins employed in the belts according to the present invention may be of various kinds. For example, they may be metal rods, and for certain conveyor belts this permits obtaining great strength with a simple construction. However, for many uses, particularly for snowmobile tracks, pins of nylon or other strong plastic are usually preferred. Retention of the pins during use is often no serious problem as the friction when a nylon pin is forced through the hollow cylinders of the segment is often sufficient. However, where a maximum of protection against sideways movement of the pins is desired, the end cylinders of each segment may be provided with an enlarged portion and a pin, such as a nylon pin, can be expanded into it. which prevents any loss of pins. This makes it somewhat more difficult to replace segments in the field, for example under the harsh conditions of use of a snowmobile, and for these uses often the unexpanded pins have adequately tight fit and present the advantage that it is a fairly easy matter with suitable tools to remove a pin or to insert a new one.

Where reinforcement is used, such as nylon fabrics, glass fiber fabrics, and the like, normally the reinforcement is needed only in the flat portions of the segments because these are the thinnest portions, the pins reinforcing the hollow cylinders at the edges, and these portions are also thicker in any event. It is much easier to mold in reinforcing material into a flat portion of a segment, and such reinforcement is normally more than adequate to confer the desired additional tensile strength. Where reinforcement is desired, the reinforcement of the flat portions of the belt segments may, therefore, be considered as a preferred form. Where unwoven fibers are used they may be mixed with the polymer prior to molding.

DESCRIPTION OF THE PREFERRED EMBODIMENTS

Figure 1:
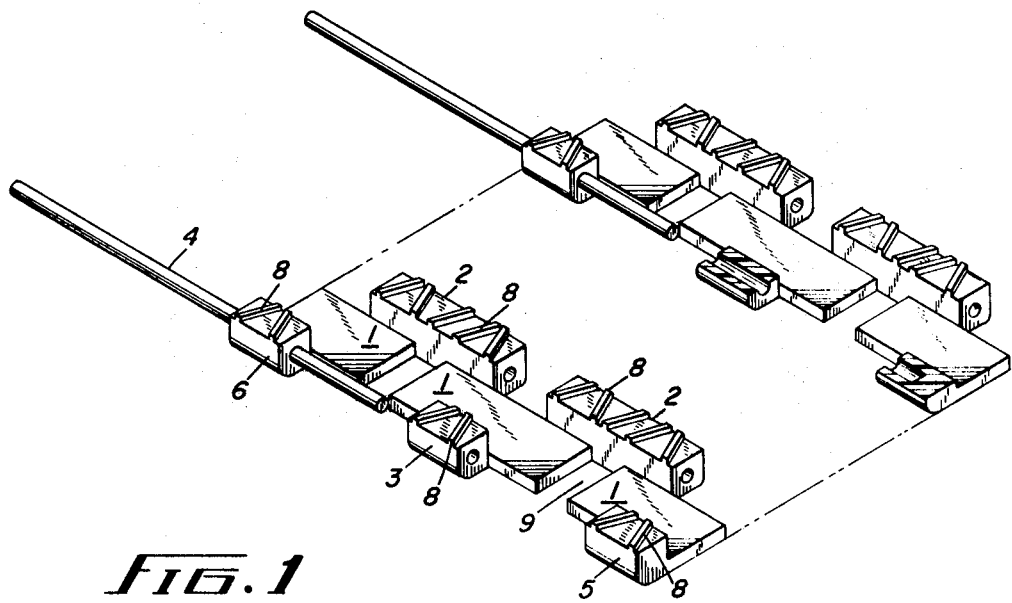
FIG. 1 is an isometric of track components with cleats.

Before describing the various types of belts shown in the drawings, the following typical polyurethane formulation will be described and is useful in all of the specific structures, although, as had been stated above, the invention is in no way limited to any particular single formulation. A prepolymer is formed with polypropylene glycol of approximately average molecular weight of 2,000, although lower molecular weight glycols may be used where maximum hardness and strength is desired and low temperature flexibility is less important. A prepolymer of the glycol and TDI with a ratio of NCO to OH of from 1.75:1 to 2:1 is formed at about 80° C., using suitable protection against oxidation, for example by providing a nitrogen atmosphere. Moca is the added in an amount to provide a ratio of $NH_2$ to $NCO$ of 1:1, in other words 100 percent extension. Somewhat lower extensions give softer materials. The prepolymer and diamine are brought together in a casting system using standard commercial casting machines. The pot life is about 15 minutes. Molding times are approximately 20 to 30 minutes, followed by an aftercure of about 1 hour at 100° C. Additional curing takes place at room temperature, and at 22 hours a compression set at 150° F. shows of from 20 to 30.

Figure 3:
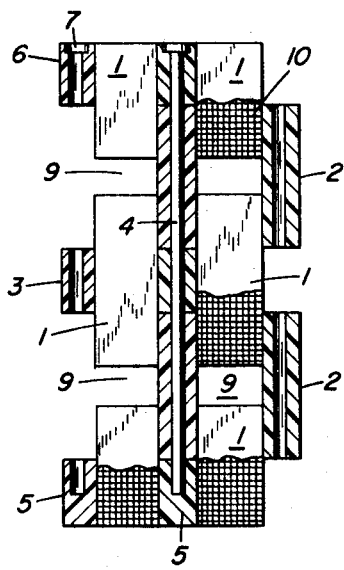
FIG. 3 is an elevation and partial section through hinge showing pin assembling two components and broken away areas showing reinforcing fabric.
Figure 2:
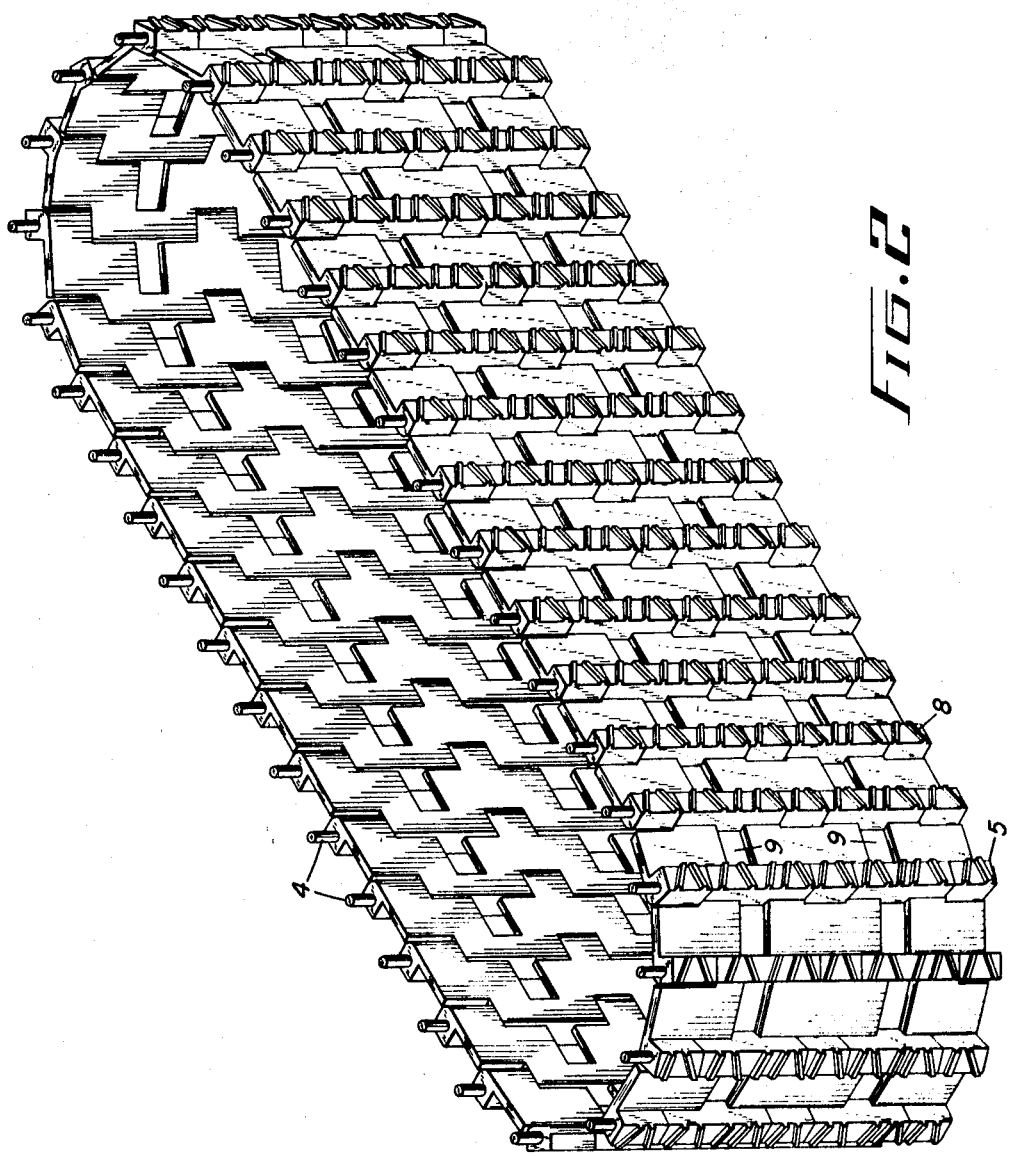
FIG. 2 is an isometric of complete assembled track.

Two general types of segmented belts or structures are described in the drawings. The first, which is shown in FIGS. 1 to 3 and 12, has some cutouts in the flat portions of the segments so that when fastened together with pins, as will be described, the hinges formed can bend through a fairly large angle and belts or tracks of maximum flexibility result. FIGS. 1 to 3 illustrate a typical snowmobile belt or track in which the segments unite to form three transversely connected endless belts with spaces between them. The segments have flat portions 1 on which are integrally molded cylindrical elements 2 and 3. They are of different sizes, on one side a longer piece bridges the spacing between the flat segment and on the other side there are shorter cylinders 3 which fit into the spaces between the cylinders 2 when the segments are abutted. When this occurs, as can be seen best in FIG. 3, there is a hollow cylinder formed through which a pin 4 is introduced. In the exploded view of FIG. 1 and in the isometric of the whole assembled snowmobile track, FIG. 2, the pins are shown partly inserted. In the case of FIGS. 1 and 2, the pins are smooth and are held in by friction only once they are inserted. One end cylinder 5 is closed so that the pin cannot stick out once inserted fully. In FIG. 3 the top short cylinder 6 is shown with an enlarged recess 7, and the pin, after fully inserted, is expanded into it. This is effective with pins which are somewhat deformable, for example nylon pins. In FIGS. 1 and 2 the pins are not expanded as the upper short cylinders are the same as the center one and therefore numbered 3 in FIGS. 1 and 2. In all of the three figures the cylinders 2, 3, 5, and 6 are shown with cleats 8 on their protruding surfaces, which increase the traction of the whole snowmobile track, as can readily be seen in FIG. 2. These cleats are slightly inclined to give protection both against sideways skidding and also forward traction and braking. Spaces 9 between the segments forming the three belts result in rather long slots into which the teeth of a driving sprocket or idling sprocket project. These sprockets are not shown as they are standard in snowmobiles and their shape is not changed by the present invention. In other words, the slots formed by the openings 9 permit the teeth of the sprocket to drive the belts positively.

It will be apparent from a consideration of the figures that any one segment can be removed if damaged and replaced without replacing the whole of the belt or track. Similarly, tracks of various lengths for snowmobiles of different design can be made up of standard segments to any desired length in segment multiples. It is, therefore, not necessary to stock endless belts of lengths corresponding to each snowmobile.

Figure 12:
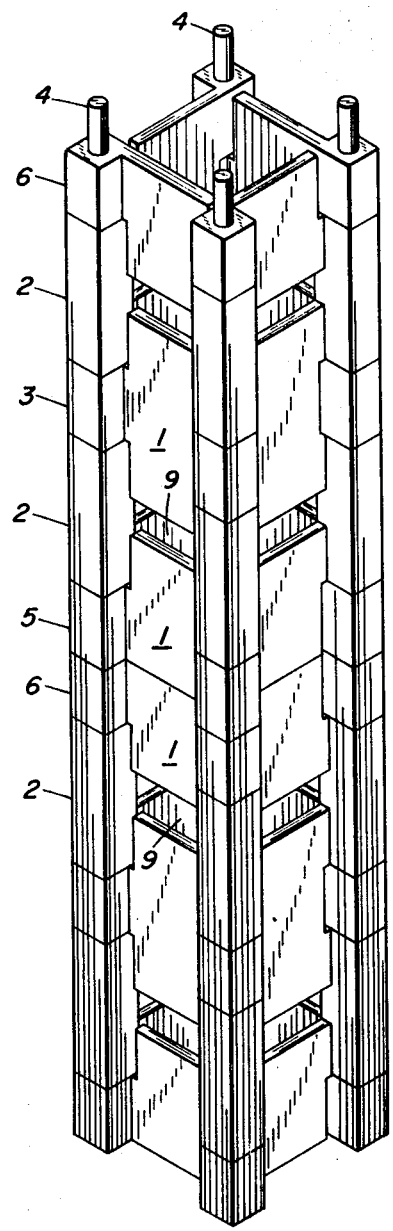
FIG. 12 is an isometric of old tract to be used as a column or antenna mast.

FIG. 12, which uses segments of the same general design as in FIGS. 1 to 3 but with uncleated surfaces on the cylinder, illustrates the formation of a square structure. It will be seen in FIG. 12 that this is made up of a number of sets of three segments, two being shown in the drawing. The pins 4 are much longer, and structures are formed which have a considerable amount of strength and are, of course, very light. They are useful, for example, for certain antenna towers and the like and can give and bend under strong winds and when suitably guyed possess considerable strength and protect against quite high winds. While in FIG. 12 there are only four segments, which might be thought of as very short belts, the construction is the same as in FIGS. 1 to 3; but of course with the shortness the hinges turn through a very large angle, in this case the maximum angle of approximately 90°. This is another field of utility for the same general type of segment and is in addition to the principal and at present most important field of use, namely snowmobile tracks, which are particularly shown in FIG. 2.

Reference has been made to reinforcements which can be provided in the flat segments if desired. This is illustrated in FIG. 3 in the broken away parts at 10 in the form of a molded in reinforcing fabric, for example of Nylon or Fiberglas cloth. In a similar manner, the reinforcements can be molded into a somewhat different design of segments shown in later figures and are illustrated specifically in broken away portions in FIG. 6.

Figure 4:
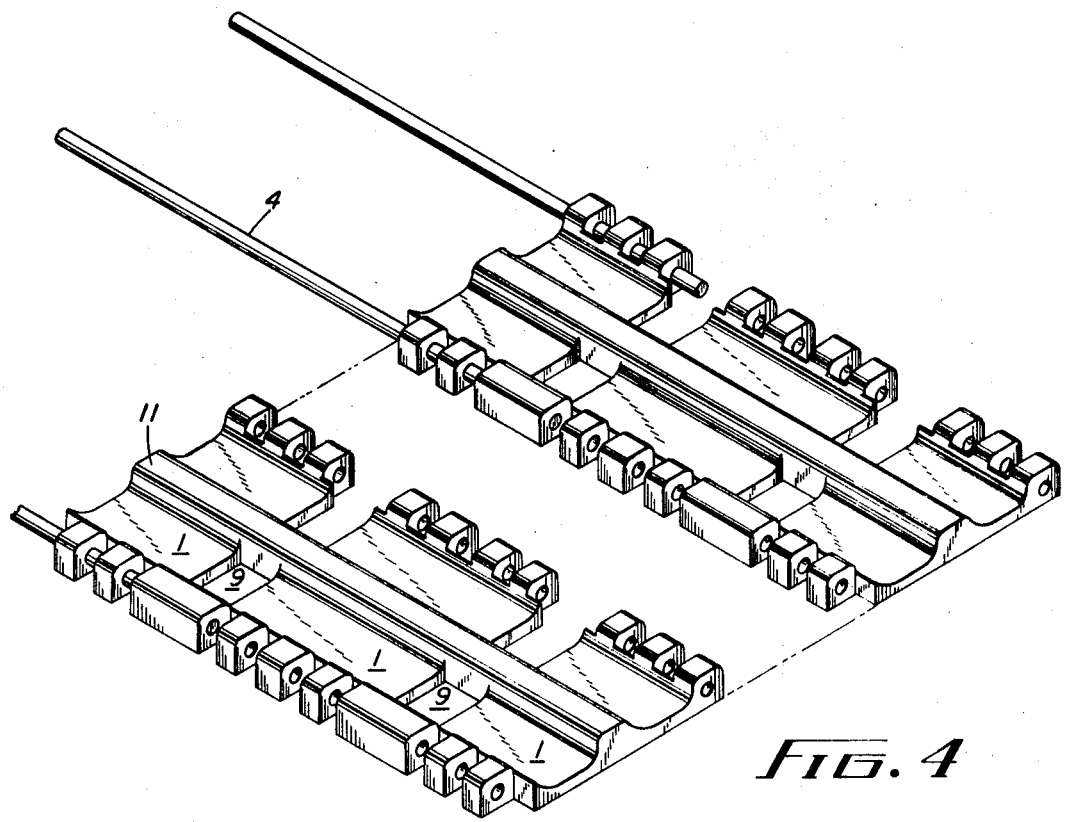
FIG. 4 is an isometric of a modified form of track components, which will be referred to briefly as new in contradistinction to the older form of track shown in FIGS. 1 to 3.
Figure 5:
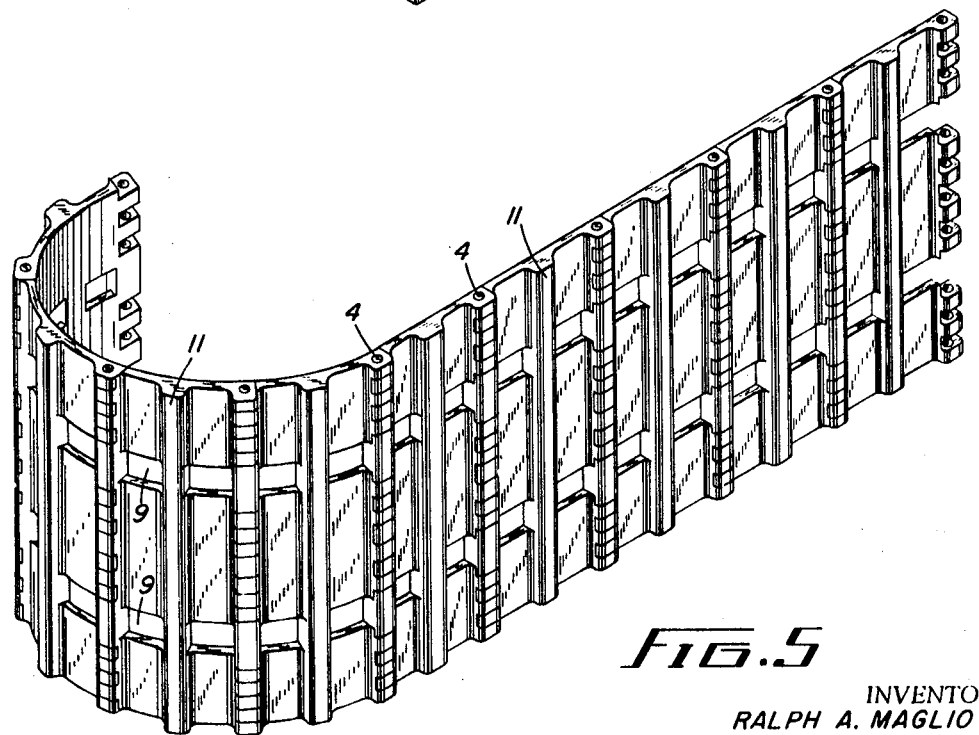
FIG. 5 is an isometric of partial assembly of new track.
Figure 6:
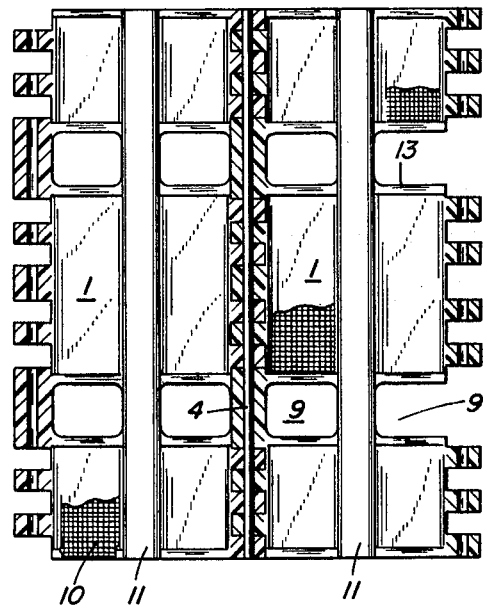
FIG. 6 is an elevation and partial section through hub showing pin assembling two components and broken away areas showing reinforcing fabric.
Figure 7:
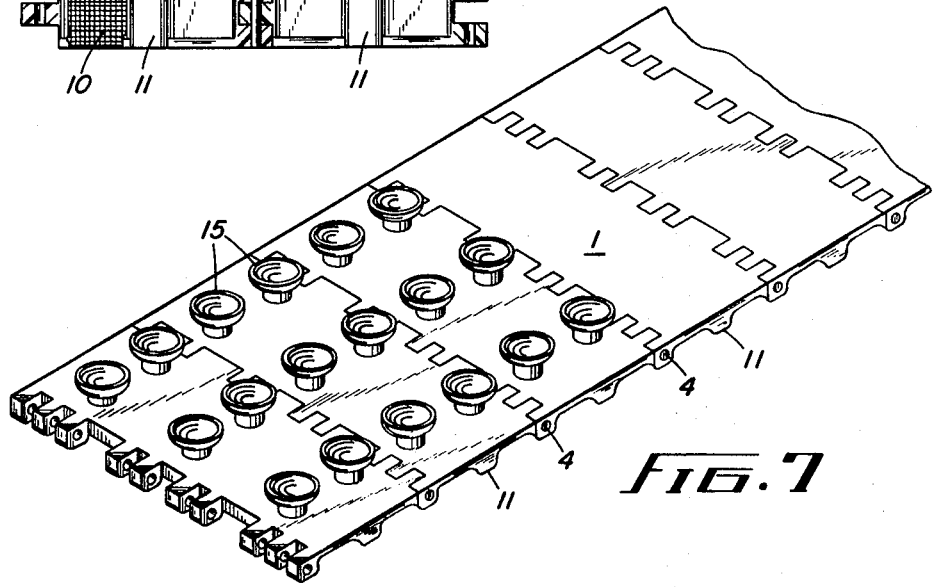
FIG. 7 is an isometric of new track for conveyor use illustrating a portion with smooth segments and a portion with segments having suction cups inserted to prevent slipping on the conveyor.
Figure 8:
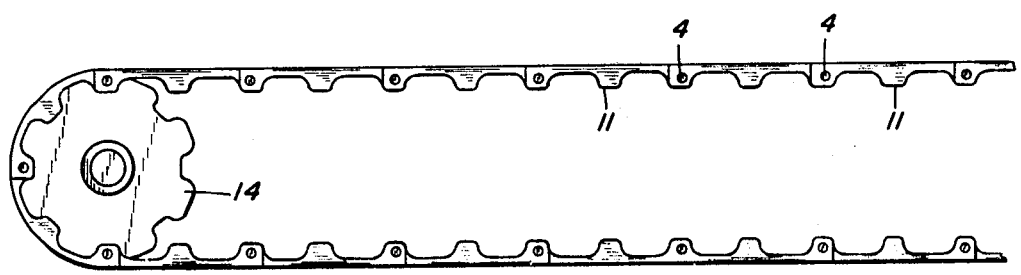
FIG. 8 is an elevation of a new truck with smooth segments for use as a conveyor or power transmission belt.

FIGS. 4 to 9 illustrate a different form of hinge, FIGs. 4 to 6 and 9 being suitable for snowmobile tracks and FIGS. 7 and 8 conveyor belts. Essentially, the pin and cylinder construction forming hinges is similar to the old style of FIGS. 1 to 3 and 12, and the pins and their mating cylinders are designated with the same reference numerals although the shape is somewhat different. It will be seen best in FIG. 4 that there are a larger number of short cylinders 3 and they are molded onto the relatively flatter sections 1 in a somewhat different manner so that they cannot bend as far. This is illustrated by FIG. 4 which shows a portion of a disassembled snowmobile track, and at the left it will be seen that the hinges cannot bend very far. This is due to the structure wherein the abutting faces of the cylinders and sections are substantially flat, and the pins are within the perpendicular projection of the abutting flat faces. It will be seen in FIG. 5, which illustrates a portion of a snowmobile track, that the amount of bending of the hinge is negligible and that the flexibility of the elastomer is all that is permitting the bending. For snowmobile tracks where the radius of curvature of driving or idler sprocket is quite large, this creates no problem.

FIGS. 4 to 6 also illustrate a different pin structure in which there are no closed ends of the cylinders. Here the pins are held in by friction. Again, as in FIG. 1, FIG. 4 is an exploded view showing the pins starting through the cylinders. In FIGS. 4 to 6 and 9 another feature is illustrated, namely that of an additional rib 11 which gives added traction for the snowmobile. The traction is not better essentially than in the tracks of FIGS. 1 to 3 but the segments are much wider for the same amount of traction, and it is this greater width that permits more flexibility of each segment, which again is shown at the left in FIG. 5.

Figure 9:
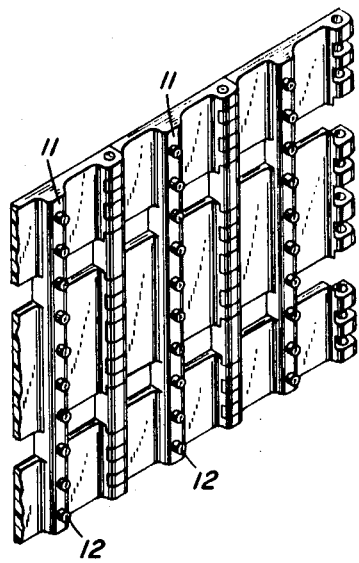
FIG. 9 is an isometric of a new snowmobile track with carbide studs.

The separate rib also permits a further modification, which is illustrated in FIG. 9, in which there are inserted carbide tipped studs 12 in holes in the ribs. This permits better traction on ice, as has been referred to above. In order to emphasize the studs more clearly, in FIG. 9 they are shown as protruding quite a distance above the surface of the elastomer, whereas normally, as is well known, in the case of studded snow tires they protrude but little above the elastomer since they do not have to be very long to grip the ice. However, if shown as hardly protruding at all, the drawing is less clear, and therefore in FIG. 9 the studs are shown as protruding an exaggerated amount.

FIG. 6 also illustrates another feature. In the spaces 9 between the belts there are molded in ridges 13 which strengthen the sides and therefore help in providing longer life as far as wear on the sprocket teeth is concerned. These ridges also increase the resistance to sideways slipping or skidding in snow and so perform a dual function.

FIGS. 7, 8 and 9 and illustrate a somewhat different type of belt with the flat segments 1 extending all the way across the full width of the belt. This type of belt is useful as a conveyor belt, as illustrated in FIG. 7, or a power transmission belt, as illustrated in FIG. 8.

An essential difference from the belts described in the preceding figures, for example FIGS. 4 and 5, is that the ridges 11 are on the inside of the belt instead of the outside and so are the hollow portions through which the pins pass. As they are of essentially the same design and are performing a similar function, the hollow members through which the pins pass to form a hinge are given the same reference numerals as in the other figures. In a similar manner the pins 4 also carry the same reference numbers. In the belts in FIGS. 7 and 8, the ridges 11 and the ridge formed by the hinge elements 2 and 3 in effect are somewhat widely spaced teeth and they cooperate with a sprocket 14 of suitable design. This is shown in FIG. 8. In general, for conveyor and power belts the spacing between hinges may be somewhat less than where a snowmobile track is involved. This has the additional advantage that even though the new style of belt does not have hinges that can turn through a large angle, the belt is still more flexible at the hinge than in the middle of a segment; and therefore, where the hinges are somewhat more closely spaced, the problem of sprockets of moderate diameter is not so acute.

The outer surface of power transmission belts is smooth, as is shown in FIG. 8. However, in the case of conveyor belts this is not always the case. The belt, of course, in the new style has no openings at the hinges and, therefore, moderately fine material, such as sand, can be conveyed without falling through the belt. The question of the smoothness of the conveyor belt outer surface, however, is involved in the nature of the things being moved on the conveyor. For example, some conveyors are used for moving packages or containers to be filled which must periodically be held up or, in the case of packages, deflected from the conveyor, and so for this type of use a smooth outer surface is needed so that the conveyor can move continuously and slide under the packages or other things that are being conveyed. In some other operations reverse is true and a package or other material conveyed must be held so that it will not turn or slide off the conveyor. In such case the belt may have either molded in suction cups 15 or they may be inserted in holes in the belt. The suction cups may be of more flexible and thinner elastomer. FIG. 7 shows at the left-hand side the modification with suction cups, at the right-hand side the smooth surface. Of course, a conveyor will usually have a uniform surface, that is either all smooth or all with suction cups, but by showing both variants on the same figure of the drawing the number of drawings is reduced.

Figure 10:
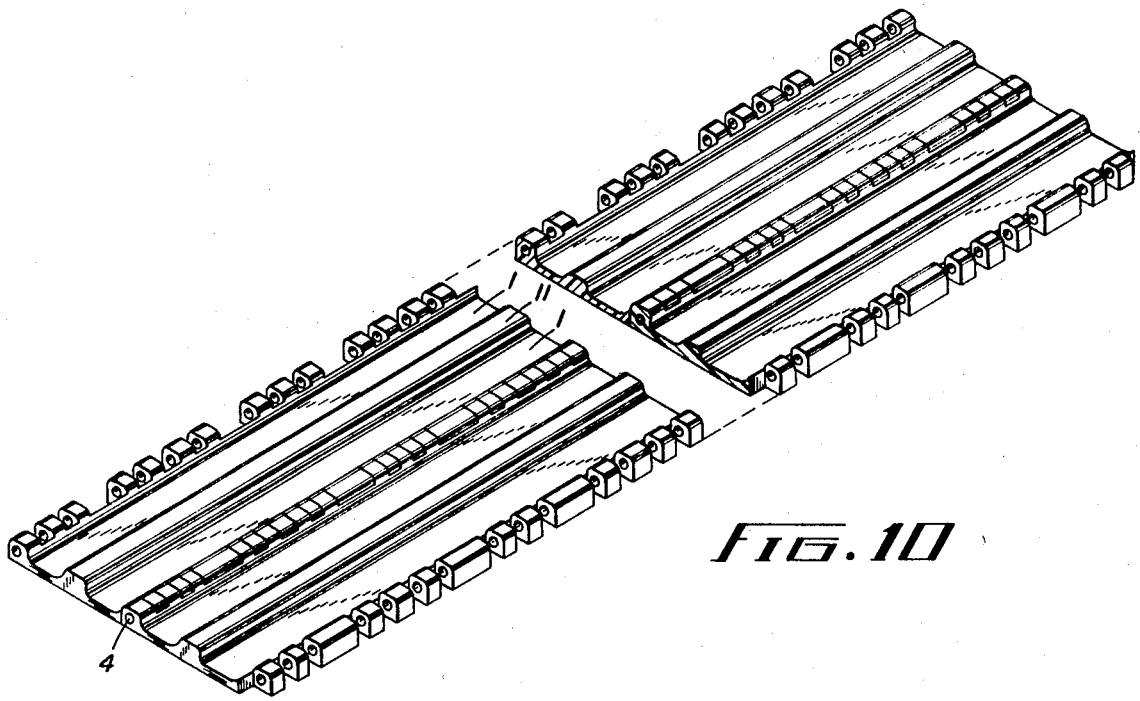
FIG. 10 is an isometric of segments to be used for Quonset huts.
Figure 11:
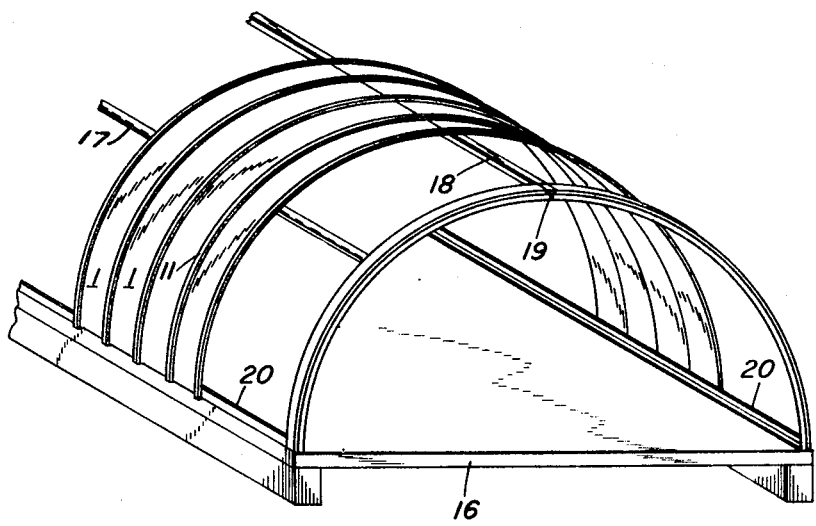
FIG. 11 is an isometric of a Quonset hut.

When handling finely divided materials, such as sand, ground cement, and the like, it is often desirable to prevent material falling off the edges of the conveyor as it moves. This can be effected in conveyors of the present invention by a molded in lip or shoulder on the ends of each segment. This is not shown in FIGS. 7, 8 and 10 as such lips are illustrated at 13 on FIG. 6 and their repetition on FIGS. 6 and 7 would only confuse the drawings. When dealing with a modification for a shelter, for example of the general shape of a Quonset hut, which is illustrated in FIG. 11, very long segments are sometimes desirable and these are illustrated in FIG. 10 and 11. The structure starts on a suitable foundation or floor 16. Since the nature of the hinges and the flat segments are the same as in the other figures, they are given the same reference numerals, although of course the segments are very much longer. Very long segments reinforcing ribs 17 are provided and these are illustrated more to the left of the drawings. For shelter purposes water tightness is of importance. For example, at the rooftree a soft insert 18 may be used which is T-shaped and fits into recesses 19 sections which are pinned together. At the start suitable hollow elements 20 may be fastened to the floor or foundation and the first segments pinned to them. This is illustrated also near the left-hand side of FIG. 11.

We claim:

6. A segmented belt or track suitable for operation in contact with particulate matter on one side of the belt only comprising a plurality of substantially equal length flat segments along the length of the track, each segment being provided with separated, mating, hollow elements on both transverse edges of the segment and the hollow elements being unitarily cast of an elastomer and the hollow elements on the two edges mating, the hollow elements extending substantially out to the outer edges of the belt; the segments being fastened together by pins through the hollow elements forming hinges, the hollow elements on the edges of the segments having substantially flat faces abutting directly against opposite substantially flat faces of adjacent mating segments said pins being within the perpendicular projection of said faces so that when pinned the hinges cannot open to any substantial angle and the flexibility of the belt at the hinge is therefore determined primarily only by the flexibility of the elastomer forming the segments, whereby the edges of each segment forming the outer edges of the belt are held against deflections up or down, thus preventing passage of particulate matter through the belt at the outer edges 2. A snowmobile track according to claim 1 in which the hollow members project beyond the flat segments to form a traction ridge transversely of the belt.

3. A snowmobile track or belt according to claim 2 in which at least one additional transverse projecting ridge is cast across the flat portions of the segments, the projection being on the same side as that of the hollow elements.

4. A snowmobile track according to claim 3 in which the segments are of polyurethane elastomer.

5. A snowmobile track according to claim 2 in which the segments are of polyurethane elastomer.

6. A belt or track according to claim 1 in which the flat portions of the segments are reinforced with embedded fibers or fabrics.

7. An endless belt according to claim 1 in which the projections of the hollow members are on the inside of the belt.

8. An endless belt according to claim 7 in which at least one transverse rib is cast in the flat portion of the segment extending out onto the inside of the belt.

9. A conveyor belt according to claim 7 is which the outer surface is smooth and continuous.

10. A conveyor belt according to claim 7 in which the outer surface is provided with friction elements.

11. A conveyor belt according to claim 10 in which the friction elements are suction cups.

12. A belt or track according to claim 1 in which the flat segments form a belt with slots when they are pinned together and some of the hollow elements are of sufficient length to bridge the spaces between the flat segment sections so that each segment is a unit and slots are formed between the portions of the flat segments.

13. A segmented snowmobile track according to claim 12 in which the hollow elements project on one side of the segments and form traction ridges transversely of the segments, the slots between the portions of flat parts of the segments being dimensioned to mate with snowmobile driving sprockets.

14. A snowmobile track according to claim 13 in which the segments are of polyurethane elastomer.

15. A belt or track according to claim 14 in which the flat portions of the segments are reinforced with embedded fibers or fabrics.

16. A snowmobile track according to claim 13 in which the pins through the hollow members are of Nylon.